(12) United States Patent
Alexopoulos et al.

(10) Patent No.: US 8,958,845 B2
(45) Date of Patent: Feb. 17, 2015

(54) DUAL BAND WLAN MIMO HIGH ISOLATION ANTENNA STRUCTURE

(75) Inventors: Nicolaos G. Alexopoulos, Irvine, CA (US); Seunghwan Yoon, Costa Mesa, CA (US)

(73) Assignee: Broadcom Corporation, Irvine, CA (US)

( * ) Notice: Subject to any disclaimer, the term of this patent is extended or adjusted under 35 U.S.C. 154(b) by 1001 days.

(21) Appl. No.: 13/031,309

(22) Filed: Feb. 21, 2011

(65) Prior Publication Data

US 2011/0228713 A1  Sep. 22, 2011

Related U.S. Application Data

(63) Continuation-in-part of application No. 12/985,527, filed on Jan. 6, 2011.

(60) Provisional application No. 61/316,094, filed on Mar. 22, 2010.

(51) Int. Cl.
| | | |
|---|---|---|
| *H04M 1/00* | (2006.01) | |
| *H01Q 1/52* | (2006.01) | |
| *H01Q 1/22* | (2006.01) | |
| *H01Q 5/00* | (2006.01) | |
| *H01Q 21/28* | (2006.01) | |
| *H01Q 21/30* | (2006.01) | |

(Continued)

(52) U.S. Cl.
CPC ............... *H04B 1/405* (2013.01); *H01Q 1/521* (2013.01); *H01Q 1/22* (2013.01); *H01Q 5/0093* (2013.01); *H01Q 21/28* (2013.01); *H01Q 21/30* (2013.01); *H04B 1/0064* (2013.01); *H04B 7/0669* (2013.01); *H04B 7/068* (2013.01); *H04B 7/10* (2013.01); *H04L 5/0023* (2013.01)
USPC ...................................... 455/550.1

(58) Field of Classification Search
USPC ............... 455/88, 550.1, 552.1, 553.1, 556.1, 455/557; 370/700 MS, 702
See application file for complete search history.

(56) References Cited

U.S. PATENT DOCUMENTS 6,795,714 B1 * 9/2004 Fickenscher et al. ...... 455/552.1
8,203,492 B2 * 6/2012 Anguera et al. ............. 343/702

(Continued)

FOREIGN PATENT DOCUMENTS

| WO | 9827614 A1 | 6/1998 |
| WO | 2006062059 A1 | 6/2006 |

OTHER PUBLICATIONS

European Search Report; EP Application No. 11001827.2; Apr. 2, 2013; 3 pages.

*Primary Examiner* — Nay A Maung
*Assistant Examiner* — Mark Woodall
(74) *Attorney, Agent, or Firm* — Garlick & Markison; Bruce E. Garlick

(57) ABSTRACT

A dual band high isolation antenna structure includes a diplexer unit, a 4-port decoupling module, a first frequency band antenna assembly, and a second frequency band antenna assembly. The diplexer unit is operable to frequency domain multiplex between a first frequency band and a second frequency band. The 4-port decoupling module is operably coupled to the diplexer unit and is operable to isolate a first pair of ports from a second pair of ports. The first frequency band antenna assembly is operably coupled to the diplexer unit and is operable to transceive wireless signals in the first frequency band. The second frequency band antenna assembly is operably coupled to a port in each of the first and second pairs of ports and is operable to transceive wireless signals in the second frequency band.

20 Claims, 9 Drawing Sheets

(51) Int. Cl.
*H04B 1/00* (2006.01)
*H04B 7/06* (2006.01)
*H04B 7/10* (2006.01)
*H04L 5/00* (2006.01)

(56) References Cited

U.S. PATENT DOCUMENTS

| | | | |
|---|---|---|---|
| 2005/0168314 A1* | 8/2005 | Alexopoulos et al. | 336/223 |
| 2005/0219010 A1* | 10/2005 | Erb | 333/126 |
| 2007/0002722 A1* | 1/2007 | Palaskas et al. | 370/201 |
| 2007/0018754 A1 | 1/2007 | Okuyama | |
| 2007/0123174 A1* | 5/2007 | Wiessner et al. | 455/73 |
| 2008/0180333 A1* | 7/2008 | Martiskainen et al. | 343/722 |
| 2008/0258977 A1* | 10/2008 | Kim et al. | 343/700 MS |
| 2009/0073054 A1* | 3/2009 | Yoon et al. | 343/700 MS |
| 2009/0096681 A1* | 4/2009 | Hunt et al. | 343/702 |
| 2009/0196371 A1* | 8/2009 | Yamamoto et al. | 375/267 |
| 2010/0109955 A1* | 5/2010 | Anguera et al. | 343/702 |
| 2010/0111143 A1* | 5/2010 | Nishikido et al. | 375/219 |

* cited by examiner

DUAL BAND WLAN MIMO HIGH ISOLATION ANTENNA STRUCTURE

CROSS REFERENCE TO RELATED PATENTS

This patent application is claiming priority under 35 USC §119(e) to a provisionally filed patent application entitled, "Dual Band WLAN MIMO High Isolation Antenna Structure", having a provisional filing date of Mar. 22, 2010, and a provisional Ser. No. 61/316,094, and is also claiming priority under 35 USC §120 as a continuation-in-part patent application of co-pending patent application entitled, "Dongle Transceiver and Antenna Assembly", having a filing date of Jan. 6, 2011, and a Ser. No. 12/985,527, all of which are hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication systems and more particularly to antennas used in such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, radio frequency (RF) wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), WCDMA, local multi-point distribution systems (LMDS), multi-channel-multi-point distribution systems (MMDS), LTE, WiMAX, and/or variations thereof. As another example, infrared (IR) communication systems may operate in accordance with one or more standards including, but not limited to, IrDA (Infrared Data Association).

Depending on the type of RF wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each RF wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Since the wireless part of a wireless communication begins and ends with the antenna, a properly designed antenna structure is an important component of wireless communication devices. As is known, the antenna structure is designed to have a desired impedance (e.g., 50 Ohms) at an operating frequency, a desired bandwidth centered at the desired operating frequency, and a desired length (e.g., ¼ wavelength of the operating frequency for a monopole antenna). As is further known, the antenna structure may include a single monopole or dipole antenna, a diversity antenna structure, the same polarization, different polarization, and/or any number of other electro-magnetic properties.

One popular antenna structure for RF transceivers is a three-dimensional in-air helix antenna, which resembles an expanded spring. The in-air helix antenna provides a magnetic omni-directional monopole antenna. Other types of three-dimensional antennas include aperture antennas of a rectangular shape, horn shaped, etc.; three-dimensional dipole antennas having a conical shape, a cylinder shape, an elliptical shape, etc.; and reflector antennas having a plane reflector, a corner reflector, or a parabolic reflector. An issue with such three-dimensional antennas is that they cannot be implemented in the substantially two-dimensional space of a substrate such as an integrated circuit (IC) and/or on the printed circuit board (PCB) supporting the IC.

Two-dimensional antennas are known to include a meandering pattern or a micro strip configuration. For efficient antenna operation, the length of an antenna should be ¼ wavelength for a monopole antenna and ½ wavelength for a dipole antenna, where the wavelength ($\lambda$)=c/f, where c is the speed of light and f is frequency. For example, a ¼ wavelength antenna at 900 MHz has a total length of approximately 8.3 centimeters (i.e., $0.25*(3\times10^8$ m/s)/$(900\times10^6$ c/s)=0.25*33 cm, where m/s is meters per second and c/s is cycles per second). As another example, a ¼ wavelength antenna at 2400 MHz has a total length of approximately 3.1 cm (i.e., $0.25*(3\times10^8$ m/s)/$(2.4\times10^9$ c/s)=0.25*12.5 cm).

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
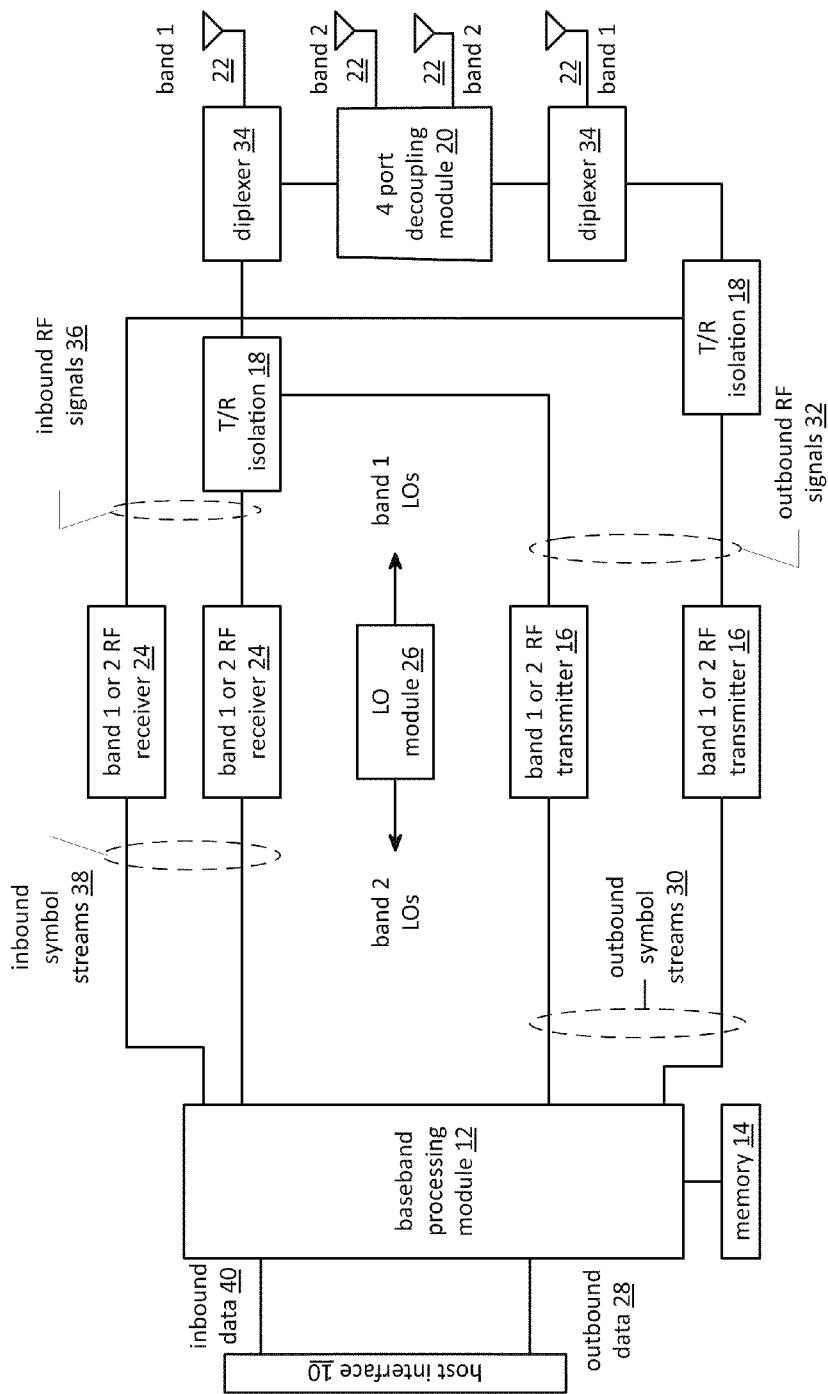
FIG. 1 is a schematic block diagram of an embodiment of a transceiver in accordance with the present invention.

FIG. 1 is a diagram of a transceiver that includes a host interface 10, a baseband processing module 12, memory 14, a local oscillation (LO) module 26, a plurality of multiple band radio frequency (RF) transmitters 16, transmit/receive (T/R) isolation modules 18, a four port decoupling module 20, a plurality of antennas 22, a plurality of multiple band RF receivers 24, and a local oscillation module 26. In an embodiment, a radio module includes a receiver section (e.g., the plurality of multiple band RF receivers 24), a transmitter section (e.g., the plurality of multiple band RF transmitters 16), and a dual band high isolation antenna structure. The dual band high isolation antenna structure includes a diplexer unit (e.g., the diplexers 34), the 4-port decoupling module 20, a first frequency band antenna assembly (e.g., antennas 22 of band 1), and a second frequency band antenna assembly (e.g., antennas 22 of band 2).

The baseband processing module 12, in combination with operational instructions stored in memory 14, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling to convert a plurality of inbound symbol streams 38 into inbound data 40. The digital transmitter functions include, but are not limited to, scrambling, encoding, interleaving, constellation mapping, modulation, inverse fast Fourier transform, cyclic prefix addition, space and time encoding, and digital baseband to IF conversion to convert outbound data 28 into a plurality of outbound symbol streams 30. The baseband processing modules 12 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 14 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 12 implements one or more of its functions via a state machine, analog circuitry, digital circuitry, and/or logic circuitry, the memory 14 storing the corresponding operational instructions is embedded with the circuitry comprising the state machine, analog circuitry, digital circuitry, and/or logic circuitry.

In an example of operation, the baseband processing module 12 receives outbound data 28 from a host device via the host interface 10 and converts it into one or more outbound symbol streams 30. This may be done in accordance with a particular mode of operation that is compliant with one or more specific modes of the various IEEE 802.11 standards. For example, the mode may indicate a frequency band of 2.4 and/or 5 GHz, a channel separation of 20 or 25 MHz and a bit rate of 54 megabits-per-second. In this general category, the mode may further indicate a particular rate ranging from 1 megabit-per-second to 54 megabits-per-second and beyond. In addition, the mode selection signal will indicate a particular type of modulation, which includes, but is not limited to, direct sequence spread spectrum (DSSS) using Barker Code Modulation, BPSK, QPSK, complimentary code keying (CCK), 16 QAM and/or 64 QAM. The mode may also include a code rate, a number of coded bits per subcarrier (NBPSC), coded bits per OFDM symbol (NCBPS), and/or data bits per OFDM symbol (NDBPS). The mode may also indicate a particular channelization for the corresponding mode that provides a channel number and corresponding center frequency. The mode may further indicate a power spectral density mask (e.g., bandwidth) value and a number of antennas to be initially used for a MIMO communication.

The baseband processing module 12, based on the mode, produces one or more outbound symbol streams 30 from the outbound data 28. For example, if the mode indicates that a single transmit antenna is being utilized for the particular mode that has been selected, the baseband processing module 12 will produce a single outbound symbol stream 104. Alternatively, if the mode indicates 2, 3 or 4 antennas (e.g., a MIMO transmission), the baseband processing module 12 produces 2, 3 or 4 outbound symbol streams 30 from the outbound data 28 as will be discussed with reference to FIG. 2.

Depending on the number of outbound streams 30 produced by the baseband module 12 and the frequency band of operation, a corresponding number of the RF transmitters 16 of the transmitter section are enabled to convert the outbound symbol streams 30 into outbound RF signals 32. In general, each of the RF transmitters 16 includes a digital filter and upsampling module, a digital to analog conversion module, an analog filter module, a frequency up conversion module, a power amplifier, and/or a radio frequency bandpass filter to convert one of the outbound symbol streams 30 into one of outbound first radio frequency band signals 32 when in the first mode (e.g., first frequency band mode) and to convert one of the outbound symbol streams 30 into one of the outbound second radio frequency band signals 32 when in the second mode (e.g., second frequency band mode).

For example, each transmitter 16 may include a first transmitter for operation in the first frequency band and a second transmitter for operation in the second frequency band. In this example, the first transmitter is enabled to convert one of the outbound symbol streams 30 into one of the outbound first radio frequency band signals 32 when in the first mode. In addition, when in the second mode, the second transmitter is enabled to convert the one outbound symbol streams 30 into one of the outbound second radio frequency band signals 32.

As another example, each of the transmitters 16 is a wide band transmitter. As such, when the radio is in a first mode (e.g., operable in the first frequency band), the wide band transmitter is enabled to convert one of the outbound symbol streams 30 into one of the outbound first radio frequency band signals 32. Also, when the radio is in the second mode (e.g., operable in the second frequency band), the wide band transmitter is enabled to convert the one plurality of outbound symbol streams 30 into one of the outbound second radio frequency band signals 32.

The RF transmitters 16 provide the outbound RF signals 32 to the transmit/receive isolation modules 18 (e.g., a TR switch, an isolator, a duplexer, a circulator, a transformer balun, etc.), which provides the outbound RF signals 32 to the diplexer 34, the four port decoupling module 20, and antennas 22. For example, a first transmit/receive isolation module 18 is operably coupled to a first diplexer 34 and is operable to isolate a first inbound RF signal 36 in the first or second frequency band from a first outbound RF signal 32 in the first or second frequency band. Similarly, a second transmit/receive isolation module 18 is operably coupled to a second diplexer 34 and is operable to isolate a second one of the inbound RF signals 36 in the first or second frequency band from a second one of the outbound RF signals 32 in the first or second frequency band.

For first frequency band outbound RF signals, the diplexers 34 provide them to the first frequency band antennas 22 (band 1). For second frequency band outbound RF signals, the diplexers provide them to the 4-port decoupling module 20, which, in turn, provides them to the second frequency band antennas 22 (band 2). In general, the antennas 22 (band 1 and band 2 (e.g., 5 GHz and 2.4 GHz)) are of a small form factor to provide high isolation between the antennas 22 and may be fabricated to physically conform to a WLAN MIMO USB dongle. Further, the four port decoupling module 20 may provide isolation between ports of up to 30 dB, or more, with a 10 dB return loss to support a broad bandwidth (e.g., 2390 MHz-2580 MHz for a monopole application and 2400 MHz-2520 MHz for a dipole application). Still further, the four port decoupling module 20 may provide a peak gain of about −1.6 dBi for a monopole application and −2.5 dBi for a dipole application. Even further, the four port decoupling module 20 can be tuned to provide a desired input and/or output impedance within a given frequency range (e.g., 2.4 GHz, 5 GHz, etc.).

When the transceiver is in a receive first frequency band mode, the antennas 22 (band 1) provide the inbound RF signals 36 to the diplexers 34, which, in turn, provide them to the transmit/receive isolation modules 18. The transmit/receive isolation module 18 provides the inbound RF signals 36 to one or more RF receivers 24. When the transceiver is in a receive second frequency band mode, the antennas 22 (band 2) provide the inbound RF signals 36 to the 4-port decoupling module 20, which isolates the inbound RF signals 36 and provides them to the diplexers 34. The diplexers provide the second frequency band inbound RF signals to the transmit/receive isolation modules 18, which, in turn, provide them to the RF receiver section.

In the first frequency band mode, the receiver section converts the inbound first radio frequency band signals 36 into a plurality of inbound symbol streams 38. For example, the receiver section includes a plurality of wide band receivers, wherein each of the wide band receiver is operable to convert one of inbound first radio frequency band signals into one of the inbound symbol streams. As another example, the receiver section includes a plurality of first frequency band receivers and a plurality of second frequency band receivers, wherein each of the first frequency band receiver is operable to convert one of the inbound first radio frequency band signals into one of the inbound symbol streams.

In the second frequency band mode, the receiver section converts the inbound second radio frequency band signals into the inbound symbol streams. For example, the receiver section includes a plurality of wide band receivers, wherein each of the plurality of wide band receiver is operable to convert one of the inbound second radio frequency band signals into one of the inbound symbol streams. As another example, the receiver section includes a plurality of first frequency band receivers and plurality of second frequency band receivers, wherein each of the plurality of second frequency band receiver is operable to convert one of the inbound second radio frequency band signals into the one of the inbound symbol streams.

The receive section provides the inbound symbol streams 38 to the baseband processing module 12. The baseband processing module 12 converts, in accordance with the digital receiver functions, the inbound symbol streams 38 into inbound data 40. The baseband received processing is discussed in greater detail with reference to FIG. 3.

Figure 2:
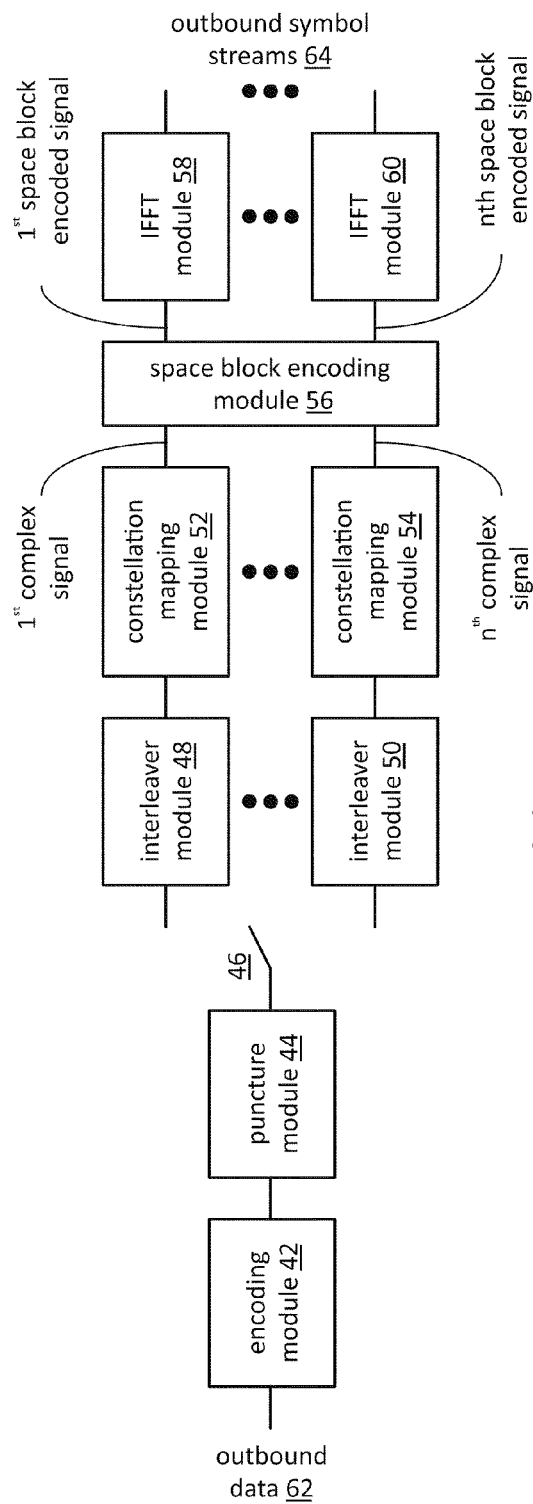
FIG. 2 is a schematic block diagram of an embodiment of transmit-side baseband processing in accordance with the present invention.

FIG. 2 is a functional schematic block diagram of baseband transmit processing within the baseband processing module 12, which includes an encoding module 42, a puncture module 44, a switch 46, an interleaving module, which may include a plurality of interleaver modules 48-50 or an interleaver and a switching module, a plurality of constellation encoding modules 52-54, a space-time and/or space-frequency block encoding module 56, and a plurality of inverse fast Fourier transform (IFFT) modules 58-60 for converting the outbound data 62 into the outbound symbol stream 64. As one of ordinary skill in the art will appreciate, the baseband transmit processing may include two or more of each of the interleaver modules 48-50, the constellation mapping modules 52-54, and the IFFT modules 58-60 depending on the number of transmit paths. In addition, one of ordinary skill in art will further appreciate that the encoding module 42, puncture module 44, the interleaver modules 48-50, the constellation mapping modules 52-54, and the IFFT modules 58-60 may function in accordance with one or more wireless communication standards including, but not limited to, IEEE 802.11a, b, g, n.

Figure 3:
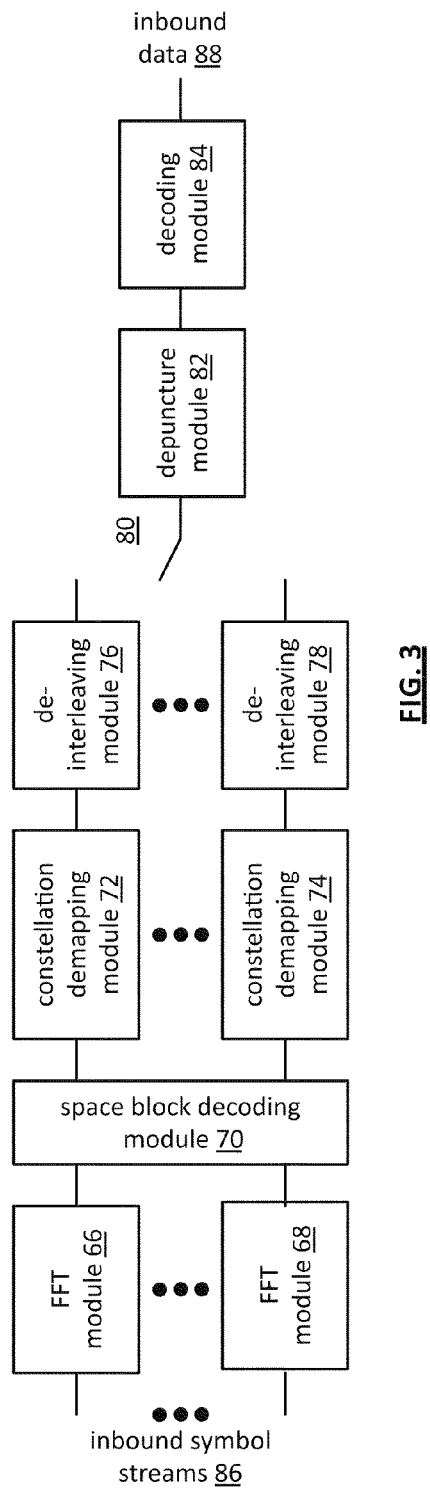
FIG. 3 is a schematic block diagram of an embodiment of receive-side baseband processing in accordance with the present invention.

FIG. 3 is a schematic block diagram of baseband receive processing that includes a plurality of fast Fourier transform (FFT) modules 66-68, a space-time and/or space-frequency block decoding module 70, a plurality of constellation demapping modules 72-74, a plurality of deinterleaving modules 76-78, a switch 80, a depuncture module 82, and a decoding module 84 for converting a plurality of inbound symbol streams 86 into inbound data 88. As one of ordinary skill in the art will appreciate, the baseband receive processing may include two or more of each of the deinterleaving modules 76-78, the constellation demapping modules 72-74, and the FFT modules 66-68. In addition, one of ordinary skill in art will further appreciate that the decoding module 84, depuncture module 82, the deinterleaving modules 76-78, the constellation demapping modules 72-74, and the FFT modules 66-68 may function in accordance with one or more wireless communication standards including, but not limited to, IEEE 802.11a, b, g, n.

In one embodiment, a plurality of FFT modules 66-68 is operably coupled to convert a plurality of inbound symbol streams 86 into a plurality of streams of space-time and/or space-frequency block encoded symbols. The space-time and/or space-frequency block decoding module 70 is operably coupled to decode the plurality of streams of space-time and/or space-frequency block encoded symbols into a plurality of streams of data symbols. The plurality of constellation demapping modules 72-74 is operably coupled to demap the plurality of streams of data symbols into a plurality of interleaved streams of data. The plurality of deinterleaving modules 76-78 is operably coupled to deinterleave the plurality of interleaved streams of data into encoded data. The decoding module 84 is operably coupled to convert the encoded data into inbound data 88. In one embodiment, the space-time and/or space-frequency block decoding module 70 performs an inverse function of the space-time and/or space-frequency block coding module 56 of FIG. 2.

In one embodiment, the encoding module 42 is operably coupled to convert outbound data 62 into encoded data in accordance with one or more wireless communication standards. The puncture module 44 punctures the encoded data to produce punctured encoded data. The plurality of interleaver modules 48-50 is operably coupled to interleave the punctured encoded data into a plurality of interleaved streams of data. The plurality of constellation mapping modules 52-54 is operably coupled to map the plurality of interleaved streams of data into a plurality of streams of data symbols, wherein each data symbol of the stream of data symbols includes one or more complex signal. The space-time and/or space-frequency block encoding module 56, which will be described in greater detail with reference to FIGS. 4-8, is operably coupled to encode a plurality of complex signals (e.g., at least two complex signals) into a plurality of space-time and/or space-frequency block encoded signals. The plurality of IFFT modules 58-60 is operably coupled to convert the plurality of space-time and/or space-frequency block encoded signals into a plurality of outbound symbol streams 64.

Figure 4:
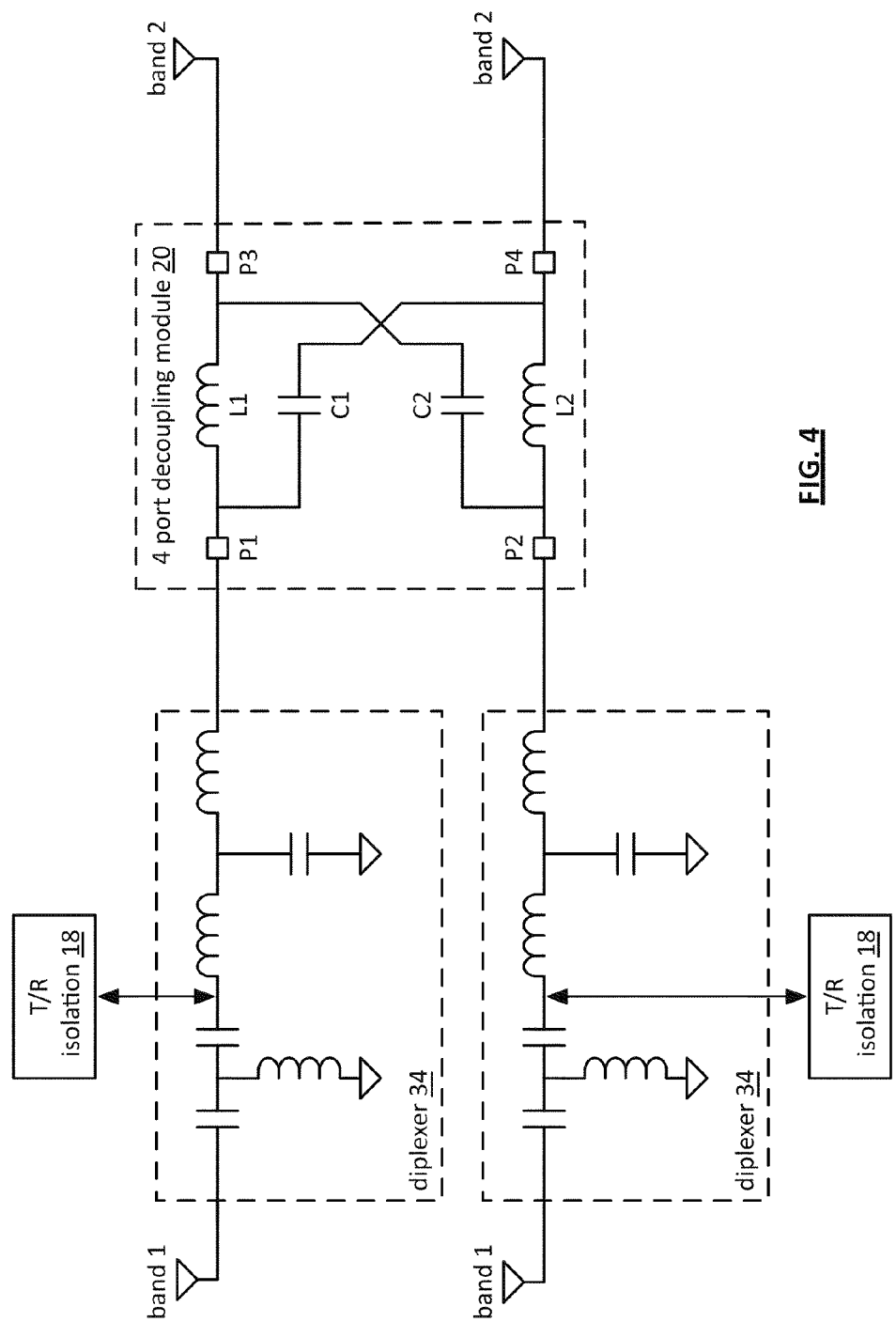
FIG. 4 is a schematic block diagram of an embodiment of diplexers and a four port decoupling module in accordance with the present invention.

FIG. 4 is a schematic block diagram of an embodiment of the diplexers 34 and the four port isolation module 20. The 4-port decoupling module includes a first pair of ports (e.g., P1 and P3), a second pair of ports (e.g., P2 and P4), a first inductor-capacitor network (e.g., C1 and L1) coupled to the first, third, and fourth ports, and a second inductor-capacitor network (e.g., C2 and L2) coupled to the second, third, and fourth ports. Note that the first inductor-capacitor network may include at least one adjustable capacitor to facilitate tuning of the first inductor-capacitor network and the second inductor-capacitor network may include at least another adjustable capacitor to facilitate tuning of the second inductor-capacitor network. In general, the capacitance of the capacitors and the inductance of the inductors are selected to provide a desired level of isolation between the ports and a desired impedance within a given frequency range. In a specific example, capacitance and inductances are chosen such that at 2.45 GHz and at 5 Ghz an isolation of greater than 25 dBm is achievable.

Each of the diplexers 34 includes three connections (e.g., ports, wireless, terminals, etc.), a capacitor-inductor network, and an inductor-capacitor network. The first connection is coupled to the T/R isolation module 18, the second connection is coupled to an antenna of the first frequency band antenna assembly, and the third connection is coupled to ports P1 and P2 of the 4-port decoupling network 20. The capacitor-inductor network is coupled to the first connection and the second connection and includes two series capacitors and an inductor. The inductor-capacitor network is coupled to the first connection and the third connection and includes two series inductors and a capacitor. Collectively, the inductors and capacitors provide frequency domain multiplexing between the two bands (e.g., 2.4 GHz and 5 GHz).

Figure 5:
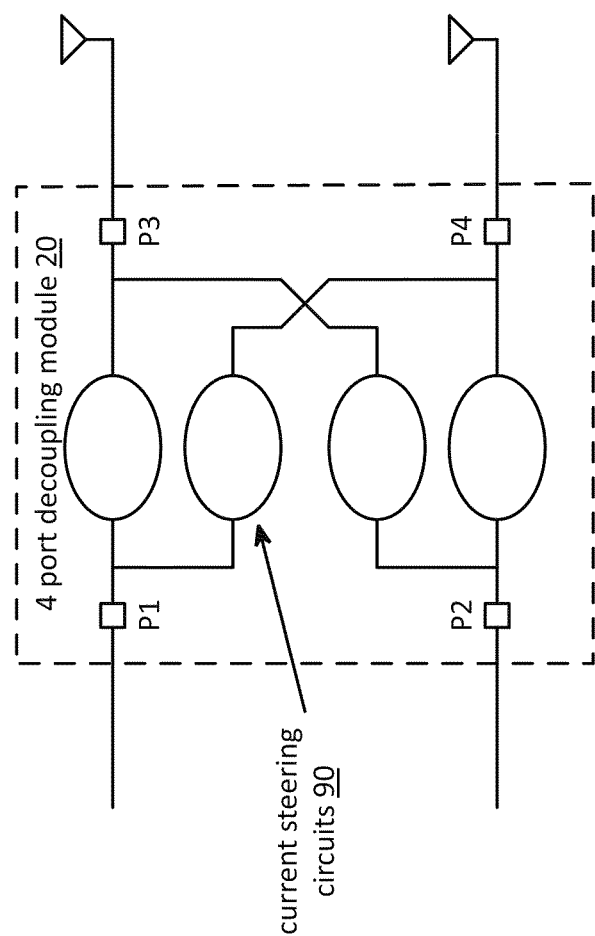
FIG. 5 is a schematic block diagram of another embodiment of a four port decoupling module in accordance with the present invention.

FIG. 5 is a schematic block diagram of another embodiment of a four port decoupling module 20 that includes four ports (P1-P4) and current steering circuits 90. The current steering circuits 90 may be uni-directional (e.g., for transmit signals or for receive signals) and/or may be bi-directional (e.g., both transmit and receive signals). In an example of operation, the current steering circuits 90, which may be capacitors, inductors, transistors, and/or other analog circuits, steers current in a desired direction at a desired level to effectively provide isolation between the ports.

Figure 6:
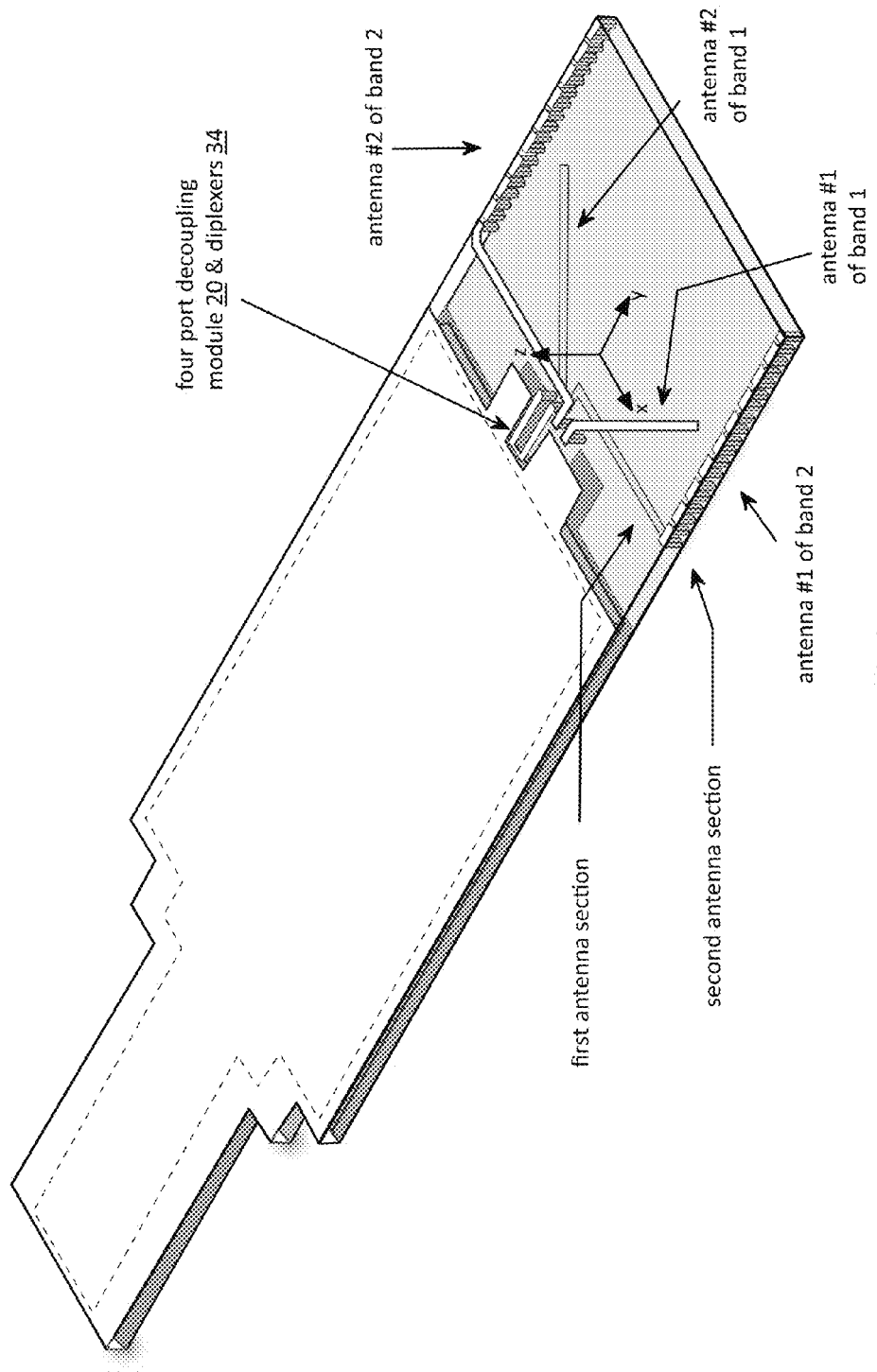
FIG. 6 is a diagram of an embodiment of an antenna structure in accordance with the present invention.

FIG. 6 is a diagram of an embodiment of an antenna structure that includes the diplexers 34, a four port decoupling module 20, first frequency band antenna assembly, and a second frequency band antenna assembly. The second frequency band antenna assembly includes a first pair of antennas (e.g., antennas 1 and 2 of band 2) and the first frequency band antenna assembly including a second pair of antennas (e.g., antennas 1 and 2 of band 1).

A first antenna (e.g., antenna #1 of band 2) of the first frequency band antenna assembly includes a first antenna section on the opposite side of the substrate (e.g., the bottom) and a second antenna section on the edge of the substrate. The first antenna section is coupled to the second antenna section and to the 4-port decoupling module and is substantially perpendicular to the second antenna section. The second antenna of the first pair of antennas (e.g., antenna #2 of band 2) includes a third antenna section on the one side of the substrate and a fourth antenna section on the opposite edge of the substrate. The third antenna section is coupled to the fourth antenna section and to the 4-port decoupling module and is substantially perpendicular to the fourth antenna section.

As shown, a first antenna (e.g., antenna #1 of band 1) of the second pair of antennas is on one side of the substrate and is within the first pair of antennas. A second antenna (e.g., antenna #2 of band 2) of the second pair of antennas is on an opposite side of the substrate and is within the first pair of antennas. Note that the substrate may be an FR4 printed circuit board that has a size of 20 mm×68 mm with a thickness of 1 mm and that the radiator portion of the lower band antenna structure may be 20 mm×18 mm such that the distance between the antennas is about 20 mm.

Figure 7:
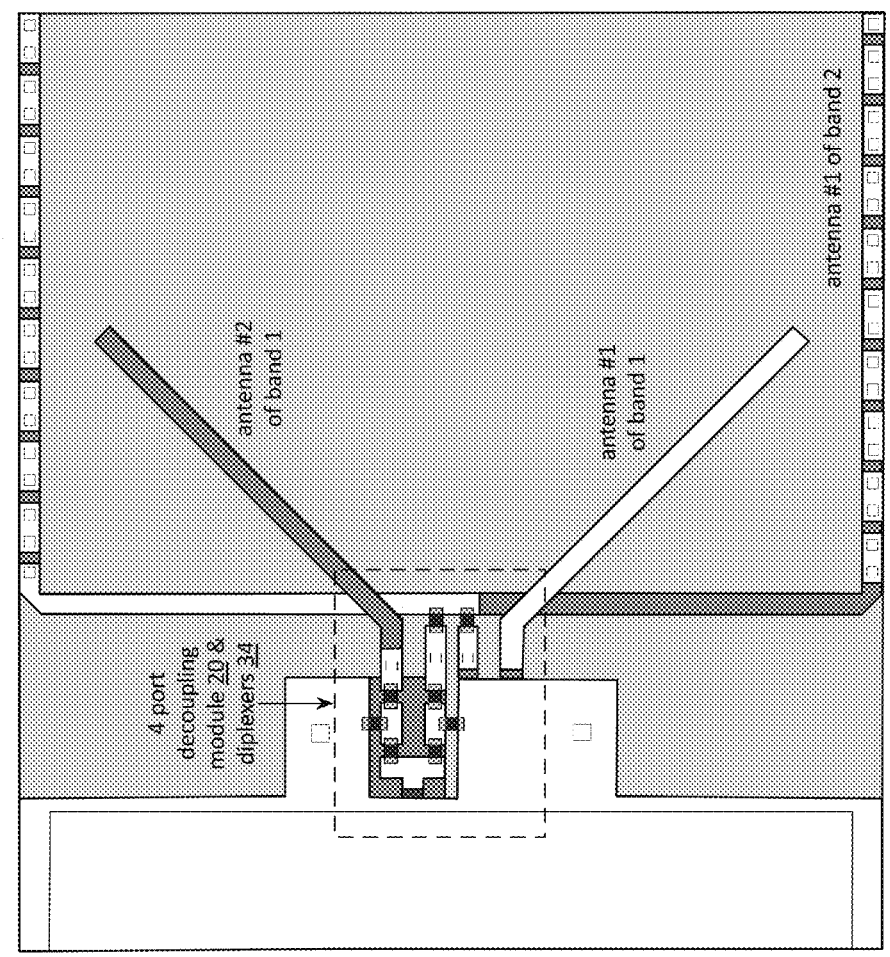
FIG. 7 is a diagram of an embodiment of an antenna in accordance with the present invention.

FIG. 7 is a diagram of an embodiment of an antenna structure that includes the 4 port decoupling module 20, the diplexers 34, the first band antenna pair, and the second band antenna pair. The trace width of the antennas may be 0.5 mm and the entire antenna structure may have an overall dimension of 18 mm by 20 mm.

Figure 8:
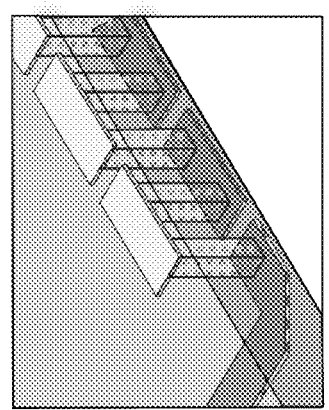
FIG. 8 is a diagram of an embodiment of an antenna in accordance with the present invention.

FIG. 8 is a close-up diagram of an embodiment of a portion of the second band antenna. In this example, the traces may have a length of 1.2 mm and a width of 0.5 mm. The distance between adjacent traces on a given side of the substrate is 0.2 mm. The height of the vias is 1 mm and the vias are spaced at 0.7 mm. Each via may have a diameter of 0.25 mm.

Figure 9:
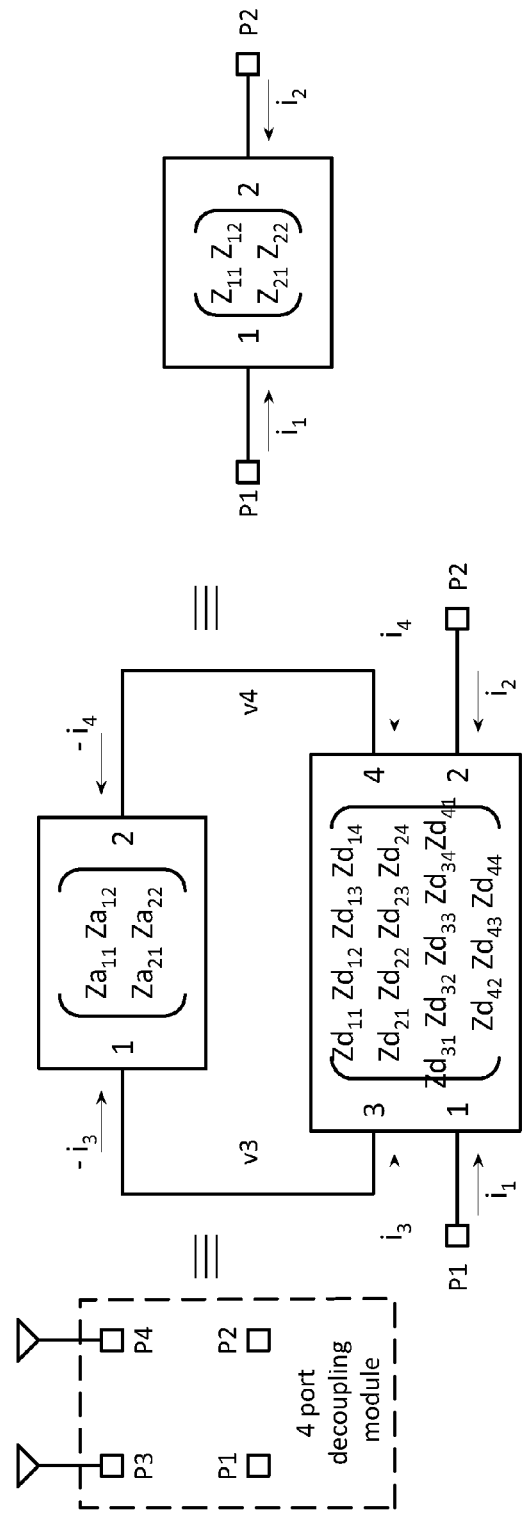
FIG. 9 is a diagram and mathematical representation of an embodiment of an antenna in accordance with the present invention.

FIG. 9 is a diagram and mathematical representation of an embodiment of an antenna.

Figure 10:
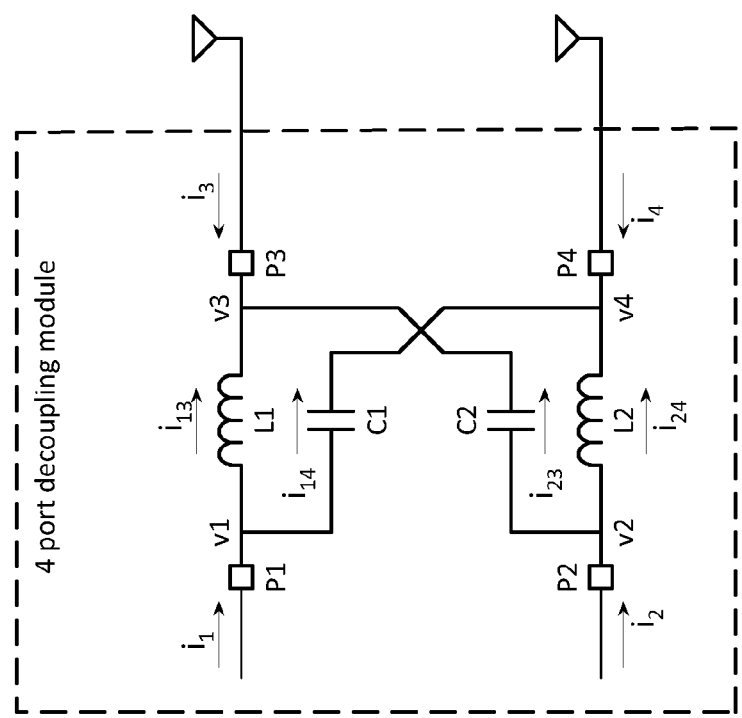
FIG. 10 is a schematic block diagram of another embodiment of a four port decoupling module in accordance with the present invention.

FIG. 10 is a diagram and mathematical representation of an embodiment of a four port decoupling module. Voltages (e.g., v1-v4) and currents (e.g., i1-14, i13, i14, i23, and i24) within the different frequency bands can be determined using a Kirchhoff's current law (KCL), Kirkhoff's voltage law (KVL), capacitor equations, inductor equations, and/or matrix analysis.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A dual band high isolation antenna structure comprises:
   a diplexer unit for frequency domain multiplexing between a first frequency band and a second frequency band;
   a 4-port decoupling module operably coupled to the diplexer unit and operable to isolate a first pair of ports from a second pair of ports, the first pair of ports including a first port and a third port, the second pair of ports including a second port and a fourth port,
   wherein the first and second ports are coupled to the diplexer unit, the 4-port decoupling module including:
      a first inductor-capacitor network coupled to the first, third, and fourth ports; and
      a second inductor-capacitor network coupled to the second, third, and fourth ports;
   a first frequency band antenna assembly operably coupled to the diplexer unit and operable to transceive wireless signals in the first frequency band; and
   a second frequency band antenna assembly operably coupled to the third and fourth ports and operable to transceive wireless signals in the second frequency band.

2. The dual band high isolation antenna structure of claim 1, wherein the diplexer unit comprises:
   a first diplexer operable to frequency domain multiplex between the first frequency band and the second frequency band for a first multiple input multiple output (MIMO) path; and
   a second diplexer operable to frequency domain multiplex between the first frequency band and the second frequency band for a second MIMO path.

3. The dual band high isolation antenna structure of claim 2, wherein each of the first and second diplexers comprises:
   a first connection;
   a second connection for coupling to an antenna of the first frequency band antenna assembly;
   a third connection for coupling to another port in each of the first and second pairs of ports;
   a capacitor-inductor network coupled to the first connection and the second connection; and
   an inductor-capacitor network coupled to the first connection and the third connection.

4. The dual band high isolation antenna structure of claim 1 further comprises:
   a substrate;
   the second frequency band antenna assembly including a first pair of antennas, wherein at least part of a first antenna of the first pair of antennas is on an edge of the substrate and at least part of second antenna of the first pair of antennas is on an opposite edge of the substrate;

the first frequency band antenna assembly including a second pair of antennas, wherein a first antenna of the second pair of antennas is on one side of the substrate and is within the first pair of antennas and a second antenna of the second pair of antennas is on an opposite side of the substrate and is within the first pair of antennas.

5. The dual band high isolation antenna structure of claim 4 further comprises:

the first antenna of the first pair of antennas including:
    a first antenna section on the opposite side of the substrate; and
    a second antenna section on the edge of the substrate, wherein the first antenna section is coupled to the second antenna section and to the 4-port decoupling module, and wherein the first antenna section is substantially perpendicular to the second antenna section; and the second antenna of the first pair of antennas includes:
    a third antenna section on the one side of the substrate; and
    a fourth antenna section on the opposite edge of the substrate, wherein the third antenna section is coupled to the fourth antenna section and to the 4-port decoupling module, and wherein the third antenna section is substantially perpendicular to the fourth antenna section.

6. The dual band high isolation antenna structure of claim 1 further comprises:

the first inductor-capacitor network including at least one adjustable capacitor to facilitate tuning of the first inductor-capacitor network; and the second inductor-capacitor network including at least another adjustable capacitor to facilitate tuning of the second inductor-capacitor network.

7. The dual band high isolation antenna structure of claim 1 further comprises:

a first transmit/receive isolation module operably coupled to a first diplexer of the diplexer unit, wherein the first transmit/receive isolation module is operable to isolate first receive wireless signals of the wireless signals in the first or second frequency band from first transmit wireless signals of the wireless signals in the first or second frequency band; and a second transmit/receive isolation module operably coupled to a second diplexer of the diplexer unit, wherein the second transmit/receive isolation module is operable to isolate second receive wireless signals of the wireless signals in the first or second frequency band from second transmit wireless signals of the wireless signals in the first or second frequency band.

8. The dual band high isolation antenna structure of claim 1 further comprises:

a common substrate that supports the diplexer unit, the 4-port decoupling module, the first frequency band antenna assembly, and the second frequency band antenna assembly.

9. The dual band high isolation antenna structure of claim 1, wherein the dual band high isolation antenna structure is configured to service dual band Wireless Local Area Network (WLAN) communications.

10. A radio module comprises:

a receiver section operable to:
convert a plurality of inbound first radio frequency band signals into a plurality of inbound symbol streams when in a first mode of operation; and
convert a plurality of inbound second radio frequency band signals into the plurality of inbound symbol streams when in a second mode of operation;

a transmitter section operable to:
convert a plurality of outbound symbol streams into a plurality of outbound first radio frequency band signals when in the first mode; and
convert the plurality of outbound symbol streams into a plurality of outbound second radio frequency band signals when in the second mode; and a dual band high isolation antenna structure including:
a diplexer unit for frequency domain multiplexing between the plurality of inbound and outbound first frequency band signals and the plurality of inbound and outbound second frequency band signals;
a 4-port decoupling module operably coupled to the diplexer unit and operable to isolate a first pair of ports from a second pair of ports, the first pair of ports including a first port and a third port, the second pair of ports including a second port and a fourth port, wherein the first and second ports are coupled to the diplexer unit, the 4-port decoupling module including:
    a first inductor-capacitor network coupled to the first, third, and fourth ports; and
    a second inductor-capacitor network coupled to the second, third, and fourth ports;
a first frequency band antenna assembly operably coupled to the diplexer unit and operable to transceive the plurality of inbound and outbound first frequency band signals; and
a second frequency band antenna assembly operably coupled to the third and fourth ports and operable to transceive the plurality of inbound and outbound second frequency band signals.

11. The radio module of claim 10 further comprises:

the receiver section including a plurality of wide band receivers, wherein each of the plurality of wide band receivers is operable to:
    convert one of the plurality of inbound first radio frequency band signals into one of the plurality of inbound symbol streams when in the first mode of operation; and
    convert one of the plurality of inbound second radio frequency band signals into the one of the plurality of inbound symbol streams when in the second mode of operation; and the transmitter section including a plurality of wide band transmitters, wherein each of the plurality of wide band transmitters is operable to:
    convert one of the plurality of outbound symbol streams into one of the plurality of outbound first radio frequency band signals when in the first mode; and
    convert the one of the plurality of outbound symbol streams into one of the plurality of outbound second radio frequency band signals when in the second mode.

12. The radio module of claim 10 further comprises:

the receiver section including a plurality of first frequency band receivers and plurality of second frequency band receivers, wherein each of the plurality of first frequency band receivers is operable to:
convert one of the plurality of inbound first radio frequency band signals into one of the plurality of inbound symbol streams when in the first mode of operation; and
wherein each of the plurality of second frequency band receivers is operable to:
convert one of the plurality of inbound second radio frequency band signals into the one of the plurality of inbound symbol streams when in the second mode of operation; and
the transmitter section including a plurality of first frequency band transmitters and a plurality of second frequency band transmitters, wherein each of the plurality of first frequency band transmitters is operable to:
convert one of the plurality of outbound symbol streams into one of the plurality of outbound first radio frequency band signals when in the first mode; and
wherein each of the plurality of second frequency band transmitters is operable to:
convert the one of the plurality of outbound symbol streams into one of the plurality of outbound second radio frequency band signals when in the second mode.

13. The radio module of claim 10 further comprises:
a baseband processing module operable to:
convert outbound data into the plurality of outbound symbol streams; and
convert the plurality of inbound symbol streams into inbound data.

14. The radio module of claim 10, wherein the diplexer unit comprises:
a first diplexer operable to frequency domain multiplex between one of the plurality of inbound and outbound first frequency band signals and one of the plurality of inbound and outbound second frequency band signals for a first multiple input multiple output (MIMO) path; and
a second diplexer operable to frequency domain multiplex between another one of the plurality of inbound and outbound first frequency band signals and another one of the plurality of inbound and outbound second frequency band signals for a second MIMO path.

15. The radio module of claim 14, wherein each of the first and second diplexers comprises:
a first connection;
a second connection for coupling to an antenna of the first frequency band antenna assembly;
a third connection for coupling to another port in each of the first and second pairs of ports;
a capacitor-inductor network coupled to the first connection and the second connection; and
an inductor-capacitor network coupled to the first connection and the third connection.

16. The radio module of claim 10, wherein the dual band high isolation antenna structure further comprises:
a substrate;
the second frequency band antenna assembly including a first pair of antennas, wherein at least part of a first antenna of the first pair of antennas is on an edge of the substrate and at least part of second antenna of the first pair of antennas is on an opposite edge of the substrate;
the first frequency band antenna assembly including a second pair of antennas, wherein a first antenna of the second pair of antennas is on one side of the substrate and is within the first pair of antennas and a second antenna of the second pair of antennas is on an opposite side of the substrate and is within the first pair of antennas.

17. The radio module of claim 16, wherein the dual band high isolation antenna structure further comprises:
the first antenna of the first pair of antennas including:
a first antenna section on the opposite side of the substrate; and
a second antenna section on the edge of the substrate, wherein the first antenna section is coupled to the second antenna section and to the 4-port decoupling module, and wherein the first antenna section is substantially perpendicular to the second antenna section; and
the second antenna of the first pair of antennas includes:
a third antenna section on the one side of the substrate; and
a fourth antenna section on the opposite edge of the substrate, wherein the third antenna section is coupled to the fourth antenna section and to the 4-port decoupling module, and
wherein the third antenna section is substantially perpendicular to the fourth antenna section.

18. The radio module of claim 10 further comprises:
the first inductor-capacitor network including at least one adjustable capacitor to facilitate tuning of the first inductor-capacitor network; and
the second inductor-capacitor network including at least another adjustable capacitor to facilitate tuning of the second inductor-capacitor network.

19. The radio module of claim 10, wherein the dual band high isolation antenna structure further comprises:
a first transmit/receive isolation module operably coupled to a first diplexer of the diplexer unit, wherein the first transmit/receive isolation module is operable to isolate a first inbound wireless signal of the plurality of inbound first or second frequency band signals from a first outbound wireless signal of the plurality of inbound first or second frequency band signals; and
a second transmit/receive isolation module operably coupled to a second diplexer of the diplexer unit, wherein the second transmit/receive isolation module is operable to isolate a second inbound wireless signal of the plurality of inbound first or second frequency band signals from a second outbound wireless signal of the plurality of inbound first or second frequency band signals.

20. The radio module of claim 10, wherein the dual band high isolation antenna structure is configured to service dual band Wireless Local Area Network (WLAN) communications.

* * * * *